G. J. NETH.
PLOTTING DEVICE.
APPLICATION FILED MAR. 12, 1917.

1,258,137.

Patented Mar. 5, 1918.
3 SHEETS—SHEET 1.

Fig. 1

Witness
Gladys Sprain
Bertha W. Fry

Inventor
George J. Neth
By _____
Attorney

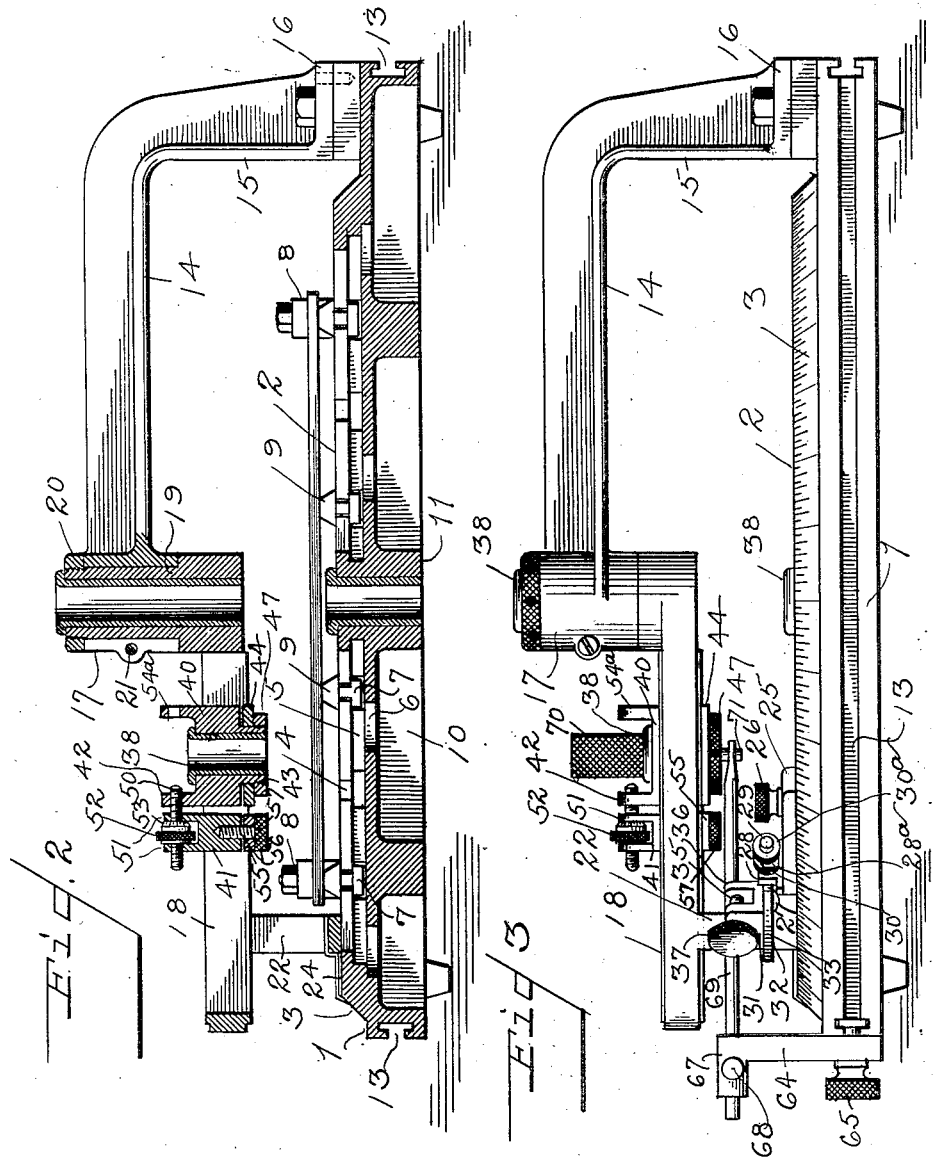

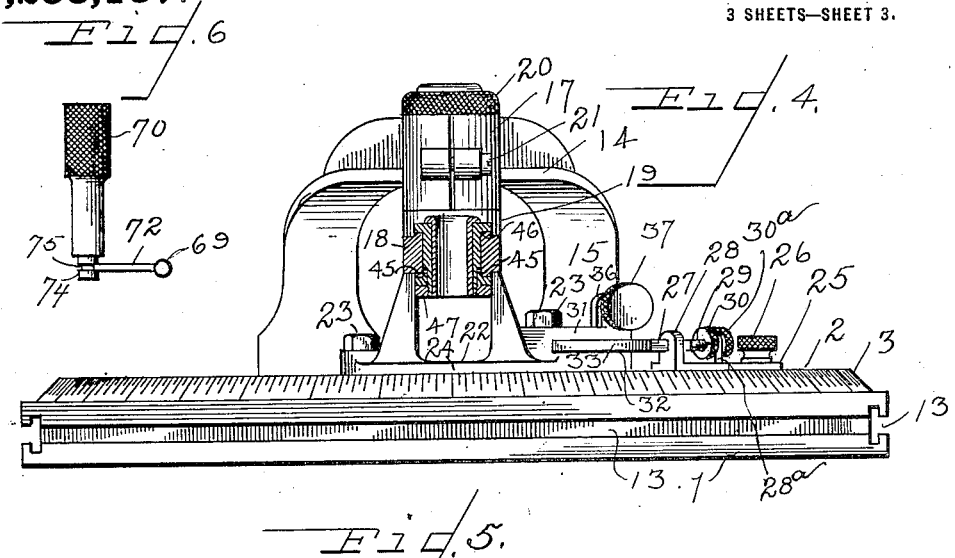
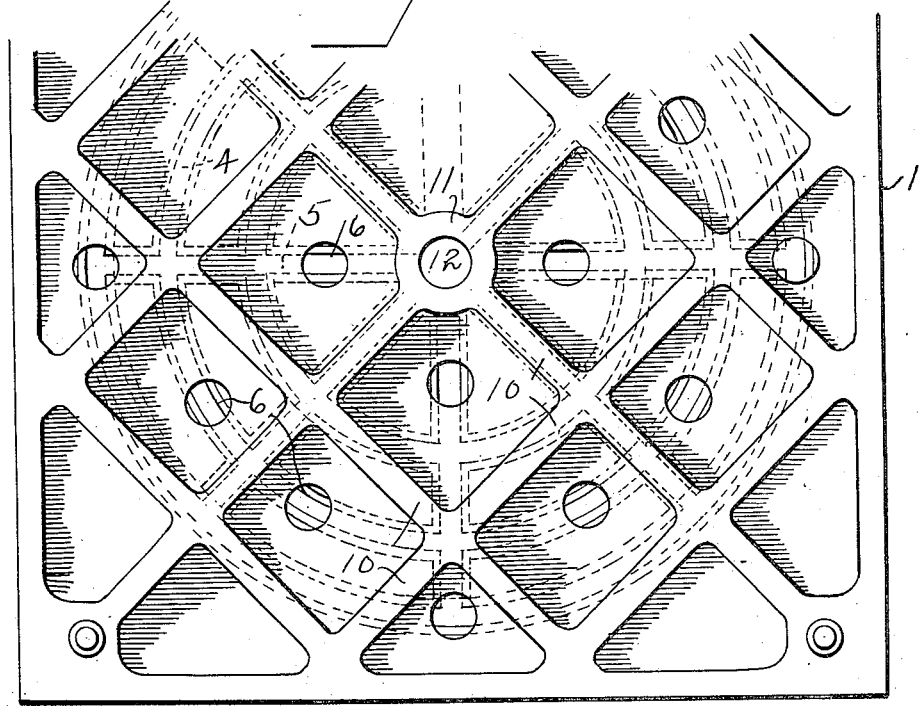

UNITED STATES PATENT OFFICE.

GEORGE J. NETH, OF DAYTON, OHIO, ASSIGNOR OF ONE-HALF TO ELMER E. McFARLAND, OF DAYTON, OHIO.

PLOTTING DEVICE.

1,258,137.

Specification of Letters Patent.    Patented Mar. 5, 1918.

Application filed March 12, 1917.   Serial No. 154,225.

*To all whom it may concern:*

Be it known that I, GEORGE J. NETH, citizen of the United States, residing at Dayton, in the county of Montgomery and State of Ohio, have invented certain new and useful Improvements in Plotting Devices, of which the following is a specification.

My invention relates to measuring instruments and more particularly to a plotting or laying out device by which various predetermined positions upon a given surface may be accurately located in relation one with the other. While the device forming the subject matter hereof has been particularly designed for use of mechanics, and particularly tool and model makers, in accurately locating various holes to be drilled in master plates or various centers to be located accurately in relation one with the other in model parts or other work, it is also applicable, with suitable modifications, to other purposes such as map and chart plotting, or in reproducing accurately designs or for other purposes wherein accuracy of measurement and location is desired.

The object of the invention is to simplify the structure as well as the means and mode of operation of plotting devices whereby they will not only be cheapened in construction, but will be more efficient in operation, universal in their application, easily and quickly adjusted, accurate, and unlikely to get out of repair.

It is customary in making master plates, model parts, jigs, fixtures, etc., to accurately plane or finish one or more sides of the work to provide fixed straight edges in relation with which different points or locations may be gaged. One of the primary objects of the present invention is to provide means for accurately gaging various points of location upon the work from a given point without the necessity of first providing finished edges from which to measure.

A further object of the invention is to provide a plotting device affording angular measurements as well as lineal measurements, and to provide means for accurately adjusting a locating element through minute degrees of variation.

A further object of the invention is to provide an improved system of interchangeable adjustably mounted bushings through which holes may be accurately drilled in the work.

With the above primary and other incidental objects in view as will more fully appear in the specification the invention consists of the features of construction, the parts and combinations thereof, and the mode of operation or their equivalents as hereinafter described and set forth in the claims.

Referring to the drawings Figure 1 is a top plan view of the assembled plotting device. Fig. 2 is a vertical sectional view on line 2—2 of Fig. 1. Fig. 3 is side elevation viewed from the right of Fig. 1. Fig. 4 is a front elevation viewed from the bottom in Fig. 1, the radial arm being shown in section on line 4—4 of said figure. Fig. 5 is a bottom plan view of a portion of the base illustrating the reinforcement means. Like parts are indicated by similar characters of reference throughout the several views. Fig. 6 is a detail view of the testing plug and contact arms.

In constructing the device there is employed a base 1 from the top of which projects a raised circular work supporting face or bed 2 having a beveled periphery 3. The working face 2 is provided with a plurality of concentric T shaped or dovetailed slots 4 connected one with another by radial slots 5 of similar size and form. At various points throughout the concentric circular slots and the radial slots enlarged openings 6 are provided through the base 1, which enables the insertion of the enlarged heads 7 of work engaging clamps 8 and work supports or rests 9 (see Fig. 2).

The beveled periphery 3 of the working face carries a series of graduations dividing the circumference of the raised face or bed into units of measurements as degrees and minutes or multiples or fractions thereof, according to the relative spacing of the graduations. To avoid confusion by attempting to show lesser units the drawings illustrate the graduations in half degrees or units of thirty minutes each. Units of any desired extent may be employed. The graduated face thus constitutes a protractor.

On its under surface the base 1 is reinforced by angularly arranged ribs 10 which in the drawing, Fig. 5, have been shown arranged in intersecting diagonal or latticed formation whereby the base 1 is rendered rigid throughout. There is also provided in the base 1 at a point concentric with the raised working face 2, a hub or boss 11, having therein a circular opening located at the exact center of the face 2. Formed in the marginal edges of the base 1 are slots 13 which are T shaped or dove tailed in cross section similar to the slots 4 and 5. The slots 13 extend on all sides of the base 1, from one extreme to the other, and intersect at the corners.

Secured adjacent to one side of the base 1 and overhanging the circular working face 2 is a bridge or bracket 14 which in the present instance has been shown as bifurcated, the extremities of the arms of which are down turned as at 15, and formed into feet 16 rigidly bolted to the base 1. The main portion of the bridge or bracket extends substantially parallel with the face 2, but spaced thereabove. The bridge or bracket arms are ribbed or otherwise shaped to afford great rigidity and strength. While in the drawing the bridge or bracket has been shown of cantaliver form overhanging the working face 2, it will be understood that if so desired the bridge may be extended entirely across the base 1 to which it may be attached at opposite sides of the circular face 2. Such extended form of bridge or support will be found especially desirable in devices of large size.

At the juncture of the arms 14 of the bridge or bracket, and concentric with the face 2 is a split sleeve or hub 17.

It is quite essential that the hub or sleeve 17 be rigidly supported in relation with the face 2. The particular supporting means for bracing or securing this hub or sleeve may be varied.

Pivotally supported in the split sleeve or hub 17 is a slotted radially disposed swinging arm 18, the hub 19 of which extends through the split sleeve 17 and is screw threaded at its extremity to receive a retaining collar 20. The split sleeve or hub 17 is provided with a transverse adjusting screw 21 by means of which it may be contracted upon the hub 19 of the swinging arm thereby affording sufficient frictional contact to temporarily hold the swinging arm in any radial position of adjustment. The hub 19 is provided with a central bore which registers in axial alinement with the bore or opening in the central hub or boss 11 of the base and constitutes a fixed locating head in registry with which a given point upon the work may be accurately positioned and in relation to which all measurements upon the work are made as hereafter described. The bore of the hub 19 of the swinging arm is therefore axially coincident with the face 2. The swinging radial arm 18 is supported at its extremity by a substantially U-shaped foot portion 22, through which extends clamping bolts 23 the heads of which engage in the outermost concentric slot 4 of the circular face 2. The construction is such that the swinging arm 18 may be oscillated to any radial position and thereafter positively secured in such position by tightening the clamping bolts 23. The different positions of the swinging radial arm 18 are determined by means of a pointer or indicator 24 carried by the U-shaped foot 22, which coacts with the protractor graduations upon the beveled periphery 3 of the face 2 to indicate the degree of angular adjustment. As before mentioned the periphery 3 of the circular face is divided into degrees and fractional parts thereof which may be minutes or fractional parts of minutes.

To accurately adjust the swinging radial arm 18 to fractional parts of the units or divisions indicated upon the peripheral scale, there is provided an adjustable abutment member 25 having a clamping bolt 26 the head of which engages in the outermost concentric slot 4 of the working face 2. This abutment member is independent of the foot 22, and is adjustable to different radial positions in the slot 4 in which positions it may be firmly secured by tightening the clamping bolt 26. The abutment member 25 carries a longitudinally movable stop pin 27 or stud which in the drawing has been shown as adjustably mounted in the lug 28 projecting upward from the abutment member. The stop pin or stud 27 has been shown rectangular in cross section. Mounted loosely in a second lug 28$^a$ is an adjusting screw 29. The screw 29 is not screw threaded into the lug 28$^a$ but slides freely therethrough. It is provided with locking nuts 30 and 30$^a$ by which it is secured in adjusted position. By loosening the lock nut 30$^a$ and then adjusting the nut 30 toward the lug 28$^a$ the screw is advanced to push the rectangular stop pin 27 outward.

Projecting from the U-shaped foot 22 is a slotted arm 31 within the slot 32 of which is pivotally mounted a rotary spiral cam 33. The trunnion shaft 34 of this spiral cam at its upper end is provided with worm gear teeth engaged by the thread of a worm 35 mounted in suitable lugs or ears 36 upon the extension or arm 31 of said U-shaped foot. The worm 35 is rotated by means of a knurled head 37 to in turn rotate the spiral cam 32. The pitch of the spiral cam 33 is preferably equivalent to one unit or division of the peripheral scale 3. If the peripheral scale is divided into degrees and minutes then the pitch of the spiral cam 32 is equivalent to one minute as measured upon the protractor scale 3. The periphery of the spiral cam is divided into fractional parts of the unit or division. In such case it would be divided into seconds and fractions thereof.

In adjusting the device for argular or radial location the whole number of degrees and minutes is measured upon the protractor scale 3 and the fractional part is measured upon the spiral cam. The arm 18 is swung laterally until the pointer or indicator 24 indicates upon the protractor scale 3 the whole number of degrees and minutes. The abutment member 25 is then adjusted toward the arm until the pin or stud bears firmly against the spiral cam 33, at a point coincident with the angle or shoulder of said cam. The abutment member 25 is then secured by tightening the clamping bolt 26 to immovably secure the abutment 25 in its adjusted position upon the face 2. To adjust the arm 18 to accurately position the indicator 24 upon the prescribed graduation, the pin 27 is adjusted longitudinally by means of the screw 29. The lock nut 30ª is relieved, and the nut 30 is rotated to feed the screw outward, thereby forcing the pin 27 forward. The movement of the pin 27, which bears upon the spiral cam 33, is transmitted to the U shaped foot 22 of the arm 18. The arm is thus gradually moved until the pointer and desired graduation are alined. To further adjust the arm 18 to the required fractional part of the unit or division of the protractor scale 3, the spiral cam 33 is rotated by means of the worm gear 35 actuated by the knurled head 37. The cam action of the spiral cam 33 against the stud or pin 27 of the immovably secured abutment 25, gradually forces the arm 18 laterally as the cam 33 is rotated. The degree of movement effected by this means is read upon the scale of fractional graduations carried by the spiral cam 33. When the arm 18 has been adjusted to the required position it is immovably secured by tightening the clamping bolts 23.

Slidingly mounted for reciprocatory movement in the slot of the arm 18 is a locating head 40 and an abutment head 41 coöperating therewith. The locating head 40 comprises a main body having a dependent screw threaded boss 43 on which is located a bearing plate 44 engaging an under side of the slotted arm 18. This bearing plate is preferably rabbeted at its opposite edges as at 45. The main body of the locating head is likewise rabbeted as as 46 for sliding engagement with the upper side of the slotted arm. Said head is adapted to be clamped in adjusted position by means of a locking collar 47 engaging the screw threaded extension or boss 43.

The locating head is provided with a central bore or opening extending entirely therethrough and concentric with the screw threaded boss or extension 43. A series of removable bushing sleeves 38 of different internal diameters are provided for insertion in the bore of the hub 19 of the swinging arm, in the bore of the hub of the base and in the bore of the locating head 40. The central bores or openings in the hub 19 and boss 11, as before described, are positioned in axial alinement one with the other. It will be understood that the bushing sleeves 38 of different sizes are interchangeable in said bore. The abutment head 41 is rabbeted in a manner similar to the head 40, and rests and slides upon the upper side of the sliding arm 18. This abutment head also carries a clamping bearing plate 55 which engages the under side of the slotted arm 18, and is rabbeted for engagement therewith in a manner similar to the bearing plate blank of the locating head. The abutment head 41 may be secured in any adjusted position by means of a screw threaded clamping stud 56 which extends through the clamping or bearing plate 55 and engages in the body of the abutment head 41. This clamping stud is provided with a knurled head 57 to facilitate the adjustment of the same. In addition to this means of securing the abutment head 41 there is provided in one side of the slotted arm a series of accurately spaced holes 59 located at predetermined distances from the center of the device. The abutment head 41 is provided with a laterally extending ear 60 having therein an opening 61 adapted to register with the openings 59 in the arm. By positioning the abutment head 41 with the hole 61 in the ear 60 in registry with one of the openings 59 and inserting a suitable pin or stud in said registered holes the abutment head is positively and firmly secured in a predetermined position.

The locating head 40 carries a laterally projecting pointer or indicator 48, which co-acts with a lineal scale of graduations 49, located upon one side of the swinging arm 18. The graduations are so located and arranged, and the pointer or indicator 48 so positioned in relation with the locating head, that the graduations of the scale will indicate the lineal distance between the axis of the swinging arm which is also the axis of the centrally disposed bushing, and the axis of the bushing carried by the locating head 40. The scale 49 may be divided into units of any denomination such as inches and fractions thereof or it may be divided by metric system into centimeters.

To provide for vernier reading by which the locating head 40 may be adjusted to fractional parts of the units or graduations of the scale the abutment head 41 is provided with an adjusting screw 50 mounted upon suitable lugs or ears 51 upon said abutment head. Intermediate the lugs 51 is located a knurled nut or head 52 screw threaded upon the adjusting screw 50. The knurled adjusting nut 52 is provided with a series of peripheral graduations 53 coacting with the pointer or mark 54 upon one of the lugs or ears 51 to indicate the degree of longitudinal movement of the screw by the rotation of the knurled nut. The adjusting screw 50 is connected at one end to a lug or ear 42 carried by the locating head 40. The construction is such that the adjustment of the screw 50 by means of the knurled head or nut 53 varies the relation of the abutment head 41 and the locating head 40 by moving the latter to and from the former. It will be understood that the holes 59 are so located that when the abutment head is so secured and the locating head is in normal or neutral relation with the abutment head pointer or indicator blank, the pointer will be in exact registry with a predetermined division or graduation upon the scale 49. Then by adjusting the knurled nut or head 53 the locating head 40 may be adjusted through any fractional part of the graduation or unit of the scale 49, which fractional unit is indicated upon the peripheral scale of the adjusting nut 53.

In employing the device in laying out master plates or some similar operation, the work is clamped to the face 2, by means of clamps 8 engaged in any of the peripheral slots 4 or radial slots 5 as before described. Work rests on supports 9 slidingly mounted in slots 4 and 5 which are distributed at various points throughout the extent of the work operated upon. Some central point is selected as a basis of operation. Such point is preferably that of a central opening or hole to be drilled in the master plate or other work. This hole is located at random in regard to the margin of the plate or work and is positioned in exact registry with the bores of the central bushings. A convenient method of so locating the hole is to first secure the work in position upon the face 2. After selecting bushings of the right size for the central bore of the hub 19 of the swinging arm, and the hub 11 of the base, a drill is passed through the bushing, thus drilling the hole in exact alinement therewith. However the hole may be drilled if so desired before the work is secured in position. The work may be located in exact alinement with the bushing by the insertion of a suitable gage rod or plug through the upper and lower bushings and through the drilled hole in the work. The use of this gage rod or plug is further required in the event that it is found necessary to loosen the work from the face 2 and rotate the same in order to gain access to some point or location which would otherwise be beneath the arm 14 of the bracket or bridge. Such plug or gage rod further prevents any shifting of the work during the various operations thereon.

Having thus located a central position upon the work all other locations are made in predetermined angular relation therewith. The angular position of succeeding locations about the given or primary location as a center being known and the distance of such locations or points in radial directions from the primary or given locations being likewise known such points may be definitely located by first accurately adjusting the swinging arm 18 to the corresponding radial positions, as indicated upon the protractor scale 3 to locate the angular relation of such points or location, and thereafter adjusting the locating head 40 longitudinally upon the swinging arm in accordance with the radial distance of the desired location from the primary or given point. These angular and radial distances having been determined and the center of a desired location accurately fixed by means of the scale 3 and 49, a bushing sleeve of the size corresponding to the desired hole is selected and positioned in the locating head 40. This bushing sleeve of desired size is employed as a guide for the drill in drilling the hole in the selected location. It will be obvious that in lieu of drilling such holes through bushing a center punch which accurately fits the selected bushing may be employed, to accurately mark or fix a center upon the work. By using a sharpened point or a stud or plug carrying a needle point inserted through the bushing, different points upon a map or chart may be located in relation to a given or central point, and likewise intricate designs may be reproduced.

In addition to the means for locating various points by angular and radial measurements there is provided means for accurately gaging or calipering the selected points with a known base line in order to check or prove the accuracy with which the operator has performed the operations. To this end there is provided a reciprocatory head 64 slidingly mounted in the marginal groove or slot of the base 1. This head is adapted to be secured in any position of adjustment by means of a clamp bolt 65, carried thereby, the head of which engages the T shaped or dove tailed marginal slot. Projecting from the top of the head 64 is a stud or pin 66 located a definite or known distance from an extended line drawn through the center of operation of the device parallel with the path of movement of the reciprocatory head 64. There are also carried by the head 64 fixed sleeves 67 in either of which is adapted to be secured by means of set screws 68 a contact rod or arm 69. This rod or arm 69 is bent at right angles adjacent to its extremity and is employed in conjunction with a gage plug 70, having projecting therefrom an extension or stud 71, equal in diameter to the stud or pin 66 carried by the head 64. After the desired position or location is accurately determined by the adjustment of the swinging arm and of the locating head 40 upon said arm, the gage plug 70 is inserted in the bushing of the locating head 40 and the reciprocatory head 64 is adjusted laterally until the contact arm 69 engages the extension 71 of the plug. This insures the pin or stud 66 being alined with the selected position in right angle relation to the path of travel of the head 64 as the head is reciprocated to and fro. The path of travel of the stud 66 constitutes the predetermined base line. By then measuring with calipers or otherwise the distance between the stud or pin 66 carried by the reciprocatory head and extension 71 of the gage plug inserted in the bushing of the locating head, the relation of the selected point with the said base line may be determined. This measurement suffices for one direction. Thereafter shifting the reciprocatory head 62 to a right angle position upon the base 1, and then adjusting the head in the marginal slot until the contact arm again engages the extension 71 of the base plug, the relation of the selected point with the second base line may be determined. It will be obvious that the reciprocatory head and contact arm will serve to locate any point by lineal measurement upon the work, while the swinging arm 18 serves to locate the same point by angular and radial measurement. By comparing the position determined by the lineal measurements with that determined by angular and radial measurements the correctness of the location is fully proven.

In order that the locating head may be adjusted to an extreme position toward the end of the swinging arm 18 the head 40 is provided with a second lug or ear 54ª similar to the lug 54. The relation of the locating head 40 and the abutment head 41 upon the arm may be reversed. The abutment head 41 may be located at the inner side of the head 40 in which case the adjusting screw 50 will be engaged with the lug or ear 54ª in lieu of the lug 54. The same knurled nut or head 52 may be employed or a similar nut having the graduations 53 arranged in reverse order may be substituted therefor.

The arm 72 of the contact or feeler arm 69 may be held in a horizontal or lateral position to engage the contact end of test plug 70 by means of a spline 73, or it may be supported in this position by a collar 74 upon the test plug as shown in Fig. 6. In the latter construction it will be understood that the neck 75 or that portion of the test plug immediately above the collar 74 is reduced to a diameter agreeing with that of the pin or stud 66 in the sliding head 64.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

Having thus described my invention, I claim:—

1. In a plotting device, a work supporting table, an elevated supporting bracket overhanging said table, a swinging arm supported upon the said bracket in a position elevated above the table and movable in a plane parallel therewith, to different radial positions, a supporting foot for the free end of the arm, a locating head carried by the swinging arm and movable radially thereon, and intersecting scales of measurement indicating the relative positions of the head.

2. In a plotting device, a work supporting table, a supporting bracket fixed in relation to the work supporting table, a swinging arm pivoted to said bracket for movement in a plane parallel with and about a center fixed in relation with the face of the work supporting table, and a locating head and an abutment head, both heads being longitudinally adjustable upon said swinging arm and adjustable means for moving one of said heads measured distances in relation to the other head.

3. In a plotting device, a work supporting table, a movable locating head, means for guiding said locating head in concentric and radial paths in a plane parallel with said table, a supporting foot for said movable locating head movable to and fro upon said work supporting table, and means for fixedly securing said supporting foot to said table in different positions of adjustment of the locating head.

4. In a plotting device, a work supporting table, a head fixed in relation to the table, a second head movable relatively to the fixed head and the table, and removable guide bushings carried by the respective heads.

5. In a plotting device, a work supporting table having a protractor scale fixed in relation to the table, a swinging arm coacting with said protractor scale, a scale of lineal graduations carried by the swinging arm, and a locating head and an auxiliary head both carried upon the arm and coacting with the scale of lineal graduations carried thereby and micrometer means for adjusting one of said heads fractional parts of the degrees of movement indicated by the lineal graduations in relation with the other head.

6. In a plotting device, a work supporting table, a fixed locating head, a locating head movable in relation to the fixed locating head, said heads being adapted to carry any one of a series of interchangeable bushings, and means for indicating the relative positions of said heads in two dimensions.

7. In a plotting device, a stationary work supporting table, a locating head, a support therefor upon which the head is movable, said support being in turn movable to different radial positions in a plane parallel with the face of the work supporting table, and an abutment member adapted to be secured to the table in different relative positions and micrometer means for adjusting the arm measured distances in relation to the abutment.

8. In a plotting device, a work supporting table, a locating head, a carrier therefor in relation with which the head is adjustable, a supporting foot for said carrier resting upon the work supporting table, and means for securing said foot in different positions of adjustment thereon.

9. In a plotting device, a work supporting table having a plurality of concentric slots in the face thereof, work engaging members engaged in said slots, a swinging support movable in a plane parallel to the face of the work supporting table to different radial positions and a locating head carried by the support and radially movable thereon.

10. In a plotting device, a work supporting table, a locating head, a support for said head upon which the head is adjustable, an abutment head also carried by the support and capable of movement in unison therewith in relation with the support, and variable interconnecting means intermediate the abutment head and the locating head whereby the relation of said heads may be varied.

11. In a plotting device, a work supporting table, a locating head movable in relation thereto, a support for said locating head, an abutment member mounted upon the support, and means for moving the locating head in relation to the abutment member.

12. In a plotting device, a work supporting table, a locating head movable in relation thereto, a support for said locating head, an abutment member mounted upon the support, and means for relatively moving the abutment member and locating head, and means for indicating the degree of relative movement of said head and member.

13. In a plotting device, a work supporting table, a locating head movable in relation thereto, a support for said locating head, an abutment member mounted upon the support, and adjusting screw connecting the abutment member and locating head one to the other.

14. In a plotting device, a work supporting table, a locating head movable in relation thereto, a support for said locating head, an abutment member mounted upon the support, a screw threaded connection between the abutment member and locating head, and an adjusting nut therefor adapted to indicate by the relative variation of the nut and screw threaded connection the degree of relative movement of the head and member effected thereby.

15. In a plotting device, a work supporting table, a locating head movable in relation thereto, a support for said locating head, an abutment member mounted upon the support, means for interengaging the abutment member with the support in different predetermined positions, and adjusting means for said locating head coacting with the abutment member to move the locating head measured distances in relation thereto.

16. In a plotting device, a work supporting table, a locating head movable in relation thereto, a support for said locating head, an abutment member mounted upon the support, said support having a series of spaced holes, means for fixedly engaging said abutment member with any one of said spaced holes, and means for adjusting the locating head measured distances in relation to the abutment member.

17. In a plotting device, a work supporting table, a locating head, a support for said locating head movable in relation to the table, an abutment member, and means coacting therewith for moving the locating head support in relation with the abutment member.

18. In a plotting device, a work supporting table, a locating head, a support for said locating head movable in relation to the table, an abutment member, means for moving the locating head support in relation to the abutment member, and means for indicating the degree of relative movement of the support and abutment member.

19. In a plotting device a work supporting table, a locating head, a support for the locating head movable in relation to the table, an abutment member adapted to be fixedly secured in its relation to the table, and variable adjusting means engaging the support, and an abutment member whereby the relation of said parts may be varied.

20. In a plotting device, a work supporting table, a locating head, a support for the locating head movable in relation to the table, an abutment member adapted to be fixedly secured in its relation to the table, and an adjusting screw adapted to vary the relations of the support and abutment member.

21. In a plotting device, a work supporting table, a locating head, a support for the locating head movable in relation to the table, an abutment member adapted to be fixedly secured in its relation to the table, a screw threaded adjusting member, and an adjusting nut therefor adapted by their relative adjustment to move the support in relation to the abutment.

22. In a plotting device, a work supporting table, a locating head, a support for the locating head movable in relation to the table, an abutment member adapted to be fixedly secured in its relation to the table, and adjusting means for the support coacting with the abutment member to move the support in relation to the table.

23. In a plotting device, a work supporting table, a locating head, a support for the locating head movable in relation to the table, an abutment member adapted to be fixedly secured in its relation to the table, and a movable cam member adapted to vary the position of the support upon the table.

24. In a plotting device, a work supporting table, a locating head, a support for the locating head movable in relation to the table, an abutment member adapted to be fixedly secured in its relation to the table, and a graduated movable cam member adapted by its movement to move the support measured distances in relation to the abutment.

25. In a plotting device, a locating head, a movable support therefor, and a spiral cam adapted by its rotation to actuate said support uniformly through distances in proportion to the degree of rotation of the cam.

26. In a plotting device, a work supporting table, a locating head, a movable support therefor, a locating scale for said support graduated in units of measurement, an abutment member, a movable cam member adapted to actuate the support and a scale graduated in fractional parts of the units of measurement of the first mentioned scale for indicating the degree of movement effected by said cam.

27. In a plotting device, a work supporting table, a locating head, a movable support therefor, an abutment member, a spiral cam coacting with the support and abutment member adapted by its rotation to move the support in relation to the abutment.

In testimony whereof I have hereunto set my hand this 3rd day of March, A. D. 1917.

GEORGE J. NETH.

Witnesses:
BERTHA W. FRY,
R. G. LANDIS.